(12) United States Patent
Honkala et al.

(10) Patent No.: US 7,173,606 B2
(45) Date of Patent: Feb. 6, 2007

(54) REMOVABLE KEYPAD FOR A PORTABLE COMMUNICATION DEVICE AND METHOD

(75) Inventors: Brian D. Honkala, McHenry, IL (US); Ted E. Krakowiak, Prospect Heights, IL (US); David R. Zeiger, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 404 days.

(21) Appl. No.: 10/661,860

(22) Filed: Sep. 12, 2003

(65) Prior Publication Data

US 2005/0057513 A1 Mar. 17, 2005

(51) Int. Cl.
*G09G 5/00* (2006.01)
*H04M 1/00* (2006.01)

(52) U.S. Cl. .................... 345/169; 455/575.1

(58) Field of Classification Search ............. 345/169, 345/156; 455/575.1, 455.3–575, 575.3, 575.4, 455/575.8; 341/21, 22; 400/663–678
See application file for complete search history.

(56) References Cited

U.S. PATENT DOCUMENTS

| | | | | |
|---|---|---|---|---|
| 5,983,073 | A * | 11/1999 | Ditzik | 455/11.1 |
| 6,055,439 | A * | 4/2000 | Helin et al. | 455/550.1 |
| 6,111,760 | A * | 8/2000 | Nixon | 361/814 |
| 6,488,425 | B1 * | 12/2002 | Spence et al. | 400/714 |
| 6,909,906 | B1 * | 6/2005 | Miyashita | 455/550.1 |
| 2002/0082042 | A1 * | 6/2002 | Mark et al. | 455/550 |
| 2002/0194793 | A1 | 12/2002 | Bowron | |
| 2003/0006968 | A1 | 1/2003 | Solomon | |
| 2003/0008677 | A1 | 1/2003 | Kim et al. | |
| 2004/0043799 | A1 * | 3/2004 | Ishibashi et al. | 455/575.1 |
| 2004/0259587 | A1 * | 12/2004 | Chadha | 455/550.1 |

* cited by examiner

*Primary Examiner*—Amr A. Awad
*Assistant Examiner*—Stephen G Sherman
(74) *Attorney, Agent, or Firm*—Design IP

(57) ABSTRACT

A keypad module for a portable communication device including a housing and plurality of keys that each actuate electronic switches. The keypad includes a keypad inlay having a left side and a right side, means for securing the keypad inlay to the front side of the housing, means for releasing the keypad inlay from the housing. The means for releasing the keypad inlay enables the keypad inlay to be removed from the housing by simultaneously depressing at least two of the plurality of keys.

25 Claims, 3 Drawing Sheets

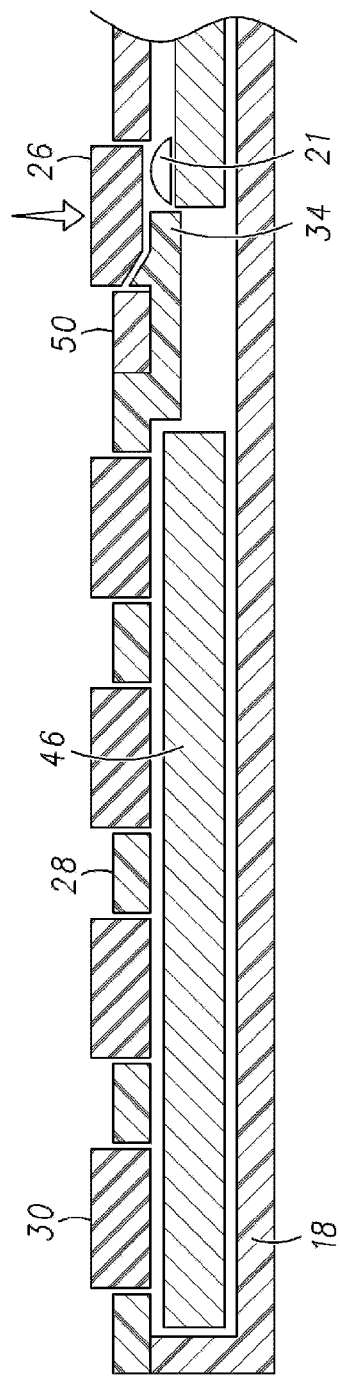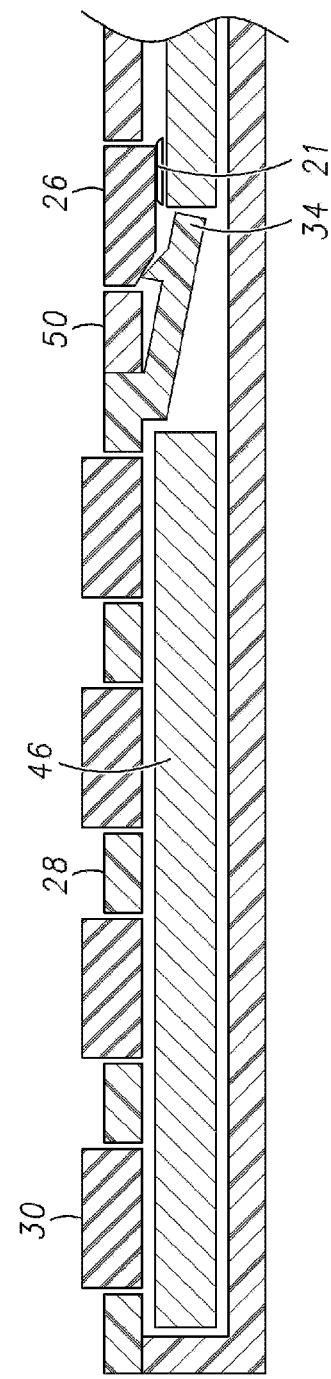

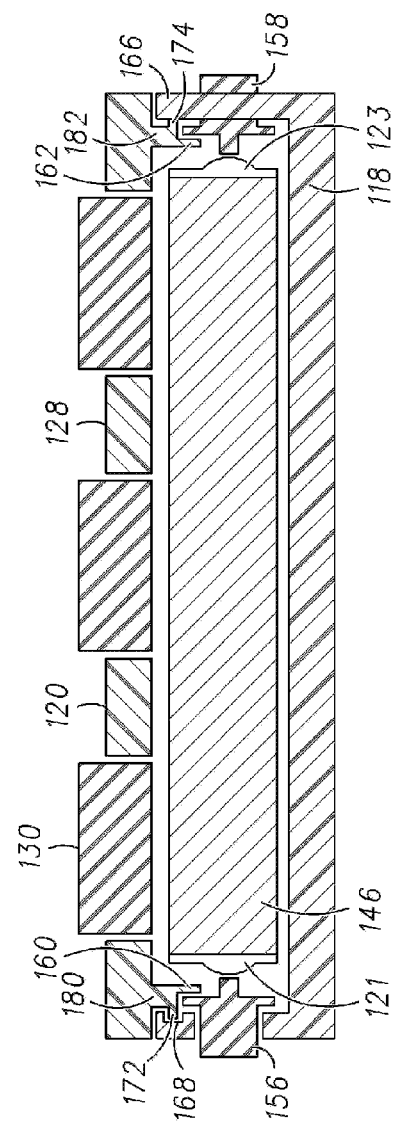
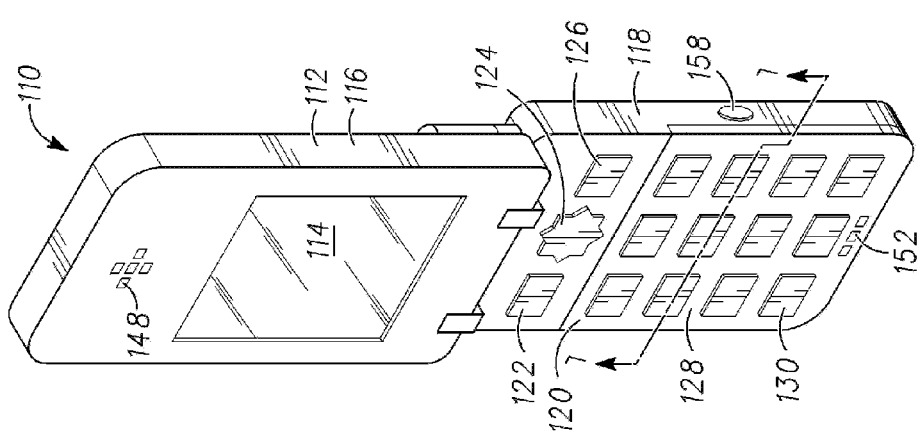
FIG. 7
FIG. 6

REMOVABLE KEYPAD FOR A PORTABLE COMMUNICATION DEVICE AND METHOD

BACKGROUND OF THE INVENTION

The invention relates generally to a portable communication device, and more particularly to a portable communication device having a removable keypad.

Wireless telephones often include parts which are design to be replaced "in the field," meaning by a consumer or retailer after the telephone has been manufactured and assembled. It is known in the art to provide a wireless telephone having face plates or other portions of its housing which are removable in the field.

Some wireless telephones allow for replacement of a keypad in the field. However, such telephones typically require tools for removal and replacement of the keypad and/or include removal structures that are visible by the consumer after the keypad is installed. Accordingly, there is a need for an improved structure that will facilitate removal of the keypad without tools and provides a release structure that is transparently to the consumer.

BRIEF DESCRIPTION OF THE DRAWINGS

The present invention will hereinafter be described in conjunction with the appended drawing figures wherein like numerals denote like elements.

FIG. 4 is an enlarged sectional view taken along line 4—4 of FIG. 3.

FIG. 5 is an enlarged sectional view taken along line 4—4 of FIG. 3, showing the end key in a depressed position.

FIG. 6 is a perspective view showing an alternate embodiment of the wireless phone of FIG. 1.

FIG. 7 is a sectional view taken along line 7—7 of FIG. 6.

DETAILED DESCRIPTION OF THE PREFERRED EMBODIMENTS

Figure 1:
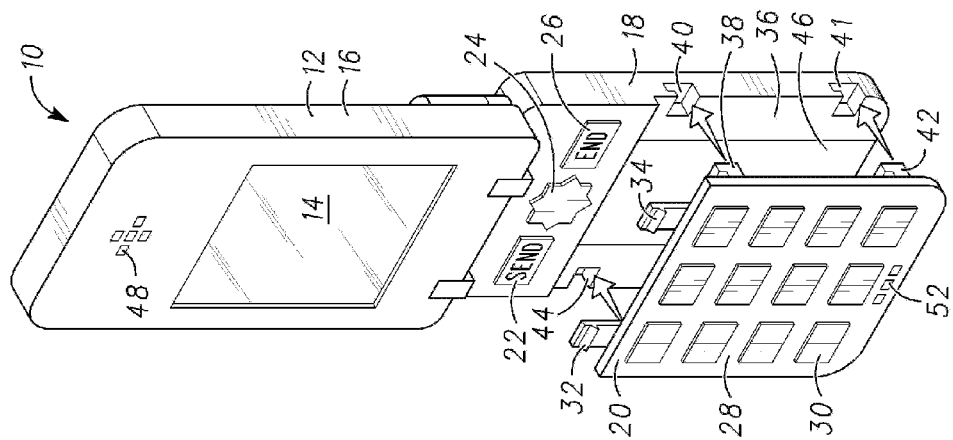
FIG. 1 is a perspective view of a wireless phone showing the keypad module in a detached position.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms used in the specification and claims to describe portions of the communication device 10 of the present invention (e.g., upper, lower, left, right, etc.) reflect the orientation the communication device 10 in the drawing figures. These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features. As used in this specification and the appended claims, the terms "attach" and "secure" are intended to be synonymous.

FIG. 1 shows a preferred embodiment of the wireless communication device 10 of the present invention, which includes an exoskeleton 12 and an endoskeleton 46 (more clearly shown in FIGS. 4 and 5). The exoskeleton 12 includes an upper housing 16, which houses a display 14 and an earpiece 48, a microphone 52, and a lower housing 18 (having left and right sides 29, 31 which are labeled in FIG. 2) and includes a send key 22, a navigation key 24 (also called a "joy button"), an end key 26, and the endoskeleton 46.

The send key 22, end key 26 and navigation key 24 are each configured to provide input to the endoskeleton 46, typically via a switch. For example, a dome switch 21 (see FIG. 4) could be located below the end key 26. The dome switch 21 is spring-biased in an open position, and therefore, is open when the end key 26 is not being pressed, as shown in FIG. 4. When the end key 26 is pressed (see FIG. 5), the dome switch 21 closes, which completes an electrical connection. A similar switch is provided for the send key 22. The navigation key 24 requires a multi-position switch or multiple switches.

The communication device 10 also includes a keypad module 20 including an inlay 28 (having left and right sides 29, 31 which are labeled in FIG. 2) and keys 30. Depending upon the application of the communication device 10, the keys 30 may be joined to all other keys on the keypad inlay 28, joined only to other keys 30 in each row or column, or may not be joined at all. Having all of the keys 30 joined simplifies removal and installation, but does not allow for replacement of individual rows or keys by the consumer, or substitution of the same at the manufacturing level.

The keypad module 20 includes means for securing the keypad inlay 28 to the front side 36 of the lower housing 18. In this embodiment, such means includes two latches 32, 34 extend from the upper end of the keypad inlay 28. These latches 32, 34 are secured to corresponding catches located on the lower housing 18 below the send and end keys 22, 26. The end key catch 50 is visible in FIGS. 4 and 5.

Figure 2:
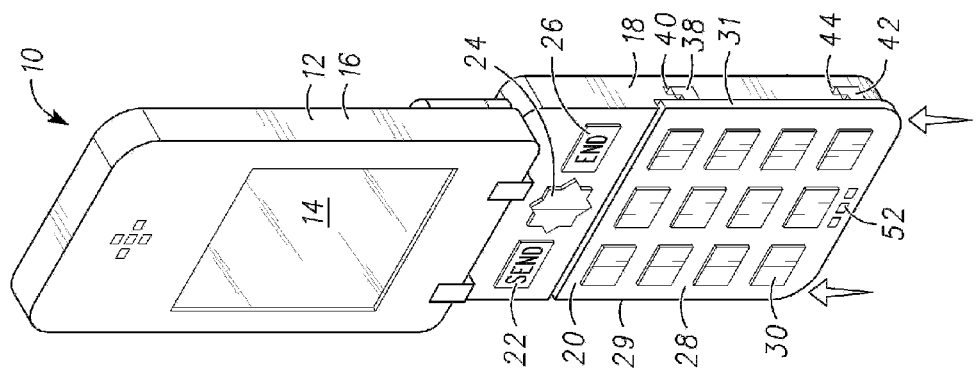
FIG. 2 is a perspective view of the wireless phone of FIG. 1, wherein the keypad module is in a partially attached position.
Figure 3:
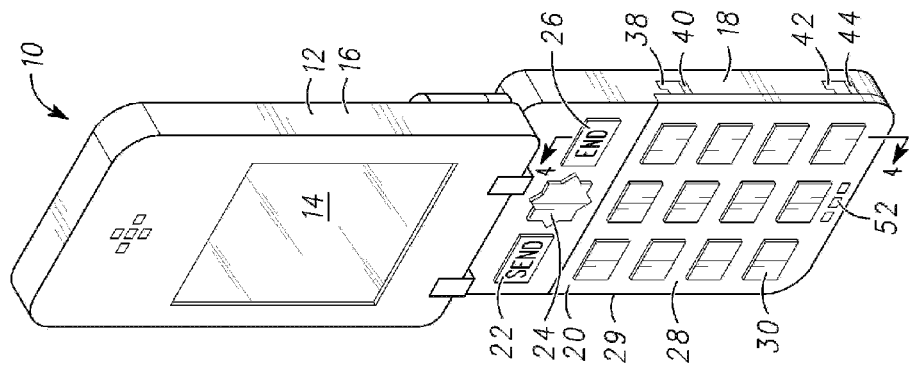
FIG. 3 is a perspective view of the wireless phone of FIG. 1, wherein the keypad module is in a fully attached position.

Securing of the keypad module 20 to the lower housing 18 is accomplished by moving the keypad module 20 toward the front surface 36 of the lower housing 18 (see arrows in FIG. 1) until the latches 32, 34 are properly aligned with the catches (see FIG. 2), then the keypad module 20 is slid upwardly until the latches 32, 34 lock with the catches (see FIG. 3 and latch 34 locking with catch 50 in FIG. 4). The keys 30 are aligned to depress dome switches (not shown) on the endoskeleton 46. When installed, the latches 32, 34 and catch 50 are not visible. This provides a more refined appearance to the communication device 10.

In this embodiment, additional structure is included to guide the keypad inlay 28 into position on the lower housing 18 and to stabilize the keypad inlay 28 when secured to the lower housing 18 by the latches 32, 34. In this embodiment, four linear slides ("L-slides") are provided. Each L-slide comprises an L-shaped flange and a corresponding guide. Upper and lower right flanges 38, 42 and their corresponding upper and lower right guides 40, 44 are shown in FIG. 1. The upper left guide is also visible 41 in FIG. 1. The upper left flange is not visible, but is in the same location on the left side 29 of the keypad inlay 28 as the upper right flange 38 is on the right side 31 of the keypad inlay 28. Similarly, the lower left flange and guide are in the same position on the left side 29 of the keypad inlay 28 as the lower right flange and guide 42, 44 are on the right side 31 of the keypad inlay 28. Each flange can be inserted into its corresponding guide only when the keypad inlay 28 is properly aligned with the lower housing 18 (see FIG. 2). Once all four flanges are inserted into their respective guides, the keypad inlay 28 can be slid toward the upper housing 16 until the latches 32, 34 snap into a locked position behind respective catches 50.

The keypad module 20 also includes means for releasing the keypad inlay 28 from the lower housing 18. In this embodiment, such means comprises by depressing a key combination that is not used for any other operational purpose. This allows the keypad module 20 to be installed and removed from the lower housing 18 without tools and prevents accidental release of the keypad module 20 during normal use of the communication device 10. In this embodiment, attachment and detachment is accomplished by simultaneously depressing the send key 22 and the end key 26. FIG. 5 shows the end key 26 in depressed position, which flexes the latch 34 downwardly—releasing it from the catch 50. The send key 22 and corresponding latch 32 operate in the same fashion. Removal of the keypad module 20 is completed by reversing the attachment steps described above. Optionally, the endoskeleton 46 could be programmed so that no electronic function is performed when the send key 22 and end key 26 are simultaneously pressed. Alternatively, the endoskeleton 46 could be programmed to provide an indication on the display 14 that the keypad module 20 is ready to be removed when the send key 22 and end key 26 are simultaneously pressed.

As described above, the present invention allows the keypad module 20 to be replaced without using tools, while maintaining a refined appearance. This simplifies installation and replacement of the keypad module 20 by retailers. The present invention also allows replacement of the keypad inlay 28 and/or the keys 30 by either a retailer or consumer.

In addition, the present invention uses keys to release the keypad module 20 (in this embodiment, the send key 22 and the end key 26) that each also actuate an electrical switch on the endoskeleton 46. This eliminates the need for dedicated keys or buttons for the release function, which simplifies the communication device and provides a cleaner appearance.

There are many alternative structures that can be used to practice the present invention. For example, the send, end and navigation keys 22, 24, 26 could be located on the keypad module 20 instead of being affixed to the lower housing 18. Other keys and key combinations could be used to release the keypad module 20. Other types of release structures could be substituted for the latch and catch structure of the first embodiment.

Other than the keypad module 20 and the structures required on the lower housing 18 to accommodate the attachment and removal of the keypad module 20, the other portions of the communication device 10 could be formed and configured in any other conventional matter. For instance, the communication device 10 could be a non-clamshell phone instead of a clamshell phone.

In this embodiment, the communication device 10 is sized and configured for use as a wireless telephone. Other types of communication devices are, of course, within the scope of the invention and could include, two-way radios and cordless (non-mobile) telephones, for example.

An alternative embodiment of the present invention is shown in FIGS. 6 and 7. Communication device 110 is very similar in structure to the communication device 10 of the first embodiment. In this embodiment, opposing left and right side buttons 156, 158 are used to release the keypad module 120 from the lower housing 118. As in the first embodiment, the left and right side buttons 156, 158 each actuate an electrical switch when depressed. In this embodiment, dome switches 121, 123 are shown. Any other suitable type of electrical switch could be used.

In this embodiment of the present invention, elements shared with the first embodiment (communication device 10) are represented by reference numerals increased by factors of 100. For example, the lower housing 18 in FIGS. 1–5 corresponds to the lower housing 118 in FIGS. 6 and 7. In the interest of clarity, some features of this embodiment that are shared with the first embodiment are numbered in FIGS. 6 and 7, but are not repeated in the specification.

The communication device 110 includes a left guide 168 (FIG. 7) and a right guide (not shown) on opposing inner sides of the lower housing 118. The left guide 168 is of similar length and location as the guide 41 of the first embodiment (see FIG. 1). A left latch 180, including a left slide 172 slides into the left guide 168 when the keypad module 120 is attached to the lower housing 118 in the same manner as shown in FIGS. 1–3 of the first embodiment. The left latch 180 is flexible so that the left slide 172 can flex inwardly a sufficient amount to clear the left catch (see right catch 166) and snap into a locked position behind the left catch.

A left arm 160 extends downwardly from the left latch 180 to overlap a portion of the left button 156 so that the left latch 180 (including left arm 160 and left slide 172) flexes inwardly when the left button is 156 depressed. Inward flexing of the left latch 180 moves the left arm 172 inwardly an amount sufficient to clear the left catch. The right button 158, right latch 182, right arm 162, right slide 174 and right catch 166 function in the same way as the corresponding left-side parts. Therefore, the keypad module 120 is released when the left and right side buttons 156, 158 are simultaneously depressed.

To decrease the likelihood of accidental release of the keypad module 120 of the second embodiment, inward flexing of the left and right latches 180, 182 may require off-center depression of respective left and right side buttons 156, 158. For example, the lower portions of each side button 156, 158 would have to be simultaneously depressed.

While the left and right side buttons 156, 158 are shown as being located on the lower housing 118, these buttons 156, 158 could alternatively be located on the keypad module 120.

While the principles of the invention have been described above in connection with preferred embodiments, it is to be clearly understood that this description is made only by way of example and not as a limitation of the scope of the invention.

The invention claimed is:

1. A keypad module for a portable communication device including a plurality of keys and housing having a left side, a right side, a front side, the keypad comprising:
   a. a keypad inlay having a left side and a right side;
   b. means for securing the keypad inlay to the front side of the housing; and
   c. means for releasing the keypad inlay from the housing;
   d. wherein the means for releasing the keypad inlay enables the keypad inlay to be removed from the housing by simultaneously depressing at least two of the plurality of keys and each of the at least two of the plurality of keys actuates an electronic switch when depressed.

2. The keypad module of claim 1, wherein the means for securing the keypad inlay to front side of the housing comprises a first latch that engages a first catch.

3. The keypad module of claim 2, wherein the means for releasing the keypad inlay from the housing comprises disengaging the first latch from the first catch by depressing a first key of the plurality of keys.

4. The keypad module of claim 3, wherein the means for securing the keypad inlay to front side of the housing comprises a second latch that engages a second catch.

5. The keypad module of claim 4, wherein the means for releasing the keypad inlay from the housing comprises disengaging the second latch from the second catch by depressing a second key of the plurality of keys.

6. The keypad module of claim 5, wherein the first key comprises a send key and the second key comprises an end key.

7. The keypad module of claim 5, wherein the first and second latches are located on the keypad inlay and the first and second catches are located on the housing.

8. The keypad module of claim 1, wherein the at least two of the plurality of keys comprises a left side button located on either the left side of the housing or the left side of the keypad inlay and a right side button on either the right side of the housing or right side of the keypad inlay and the means for releasing the keypad inlay from the housing comprises simultaneously depressing the left and right side buttons.

9. The keypad module of claim 8, wherein the means for releasing the keypad inlay from the housing comprises simultaneously depressing the left and right side buttons using an off-center keystroke on both the left and right side buttons, and wherein a non-off-center keystroke on either or both of the left and right side buttons will not release the keypad inlay when the left and side buttons are simultaneously depressed.

10. The keypad module of claim 8, wherein the means for securing the keypad inlay to the housing comprises a first arm that engages a first catch and a second arm that engages a second catch.

11. The keypad module of claim 10, wherein the means for releasing the keypad inlay from the housing comprises disengaging the first arm from the first catch by depressing the left side key and disengaging the second arm from the second catch by depressing the right side key.

12. The keypad module of claim 11, wherein the means for releasing the keypad inlay from the housing comprises releasing the first arm from the first catch by depressing the left side key using an off-center keystroke and releasing the second arm from the second catch by depressing the right side key using an off-center keystroke, and wherein a non-off-center keystroke on the left side key will not release the first arm from the first catch and a non-off-center keystroke on the right side key will not release the second arm from the second catch.

13. The keypad module of claim 1, wherein the means for securing the keypad inlay to the front side of the housing are not visible when the keypad inlay is attached to the housing.

14. The keypad module of claim 1, wherein the at least two of the plurality of keys are located on the keypad inlay.

15. The keypad module of claim 1, wherein the at least two of the plurality of keys are built into the housing.

16. A keypad module for a portable communication device including a plurality of keys and a housing having a left side, a right side, a front side, the keypad module comprising:

a. a keypad configured to be attached to the housing and having a left side and a right side; and
b. first and second latches that engage first and second catches located on the housing, respectively, when the keypad inlay is attached to the housing, thereby securing the keypad inlay to the housing;
c. wherein the first and second latches are released from the first and second catches, respectively, when at least two of the plurality of keys are simultaneously depressed, thereby releasing the keypad inlay from the housing, and wherein each of the at least two of the plurality of keys actuates an electronic switch when depressed.

17. The keypad module of claim 16, wherein the at least two of the plurality of keys comprise a left side button located on either the left side of the housing or the left side of the keypad inlay and a right side button on either the right side of the housing or right side of the keypad inlay.

18. The keypad module of claim 17, wherein the first and second latches are released from the first and second catches, respectively, when the left and right side buttons are simultaneously depressed using an off-center keystroke on both the left and right side keys, and wherein a non-off-center keystroke on the left side key will not release the first latch from the first catch and a non-off-center keystroke on the right side key will not release the second latch from the second catch.

19. A portable communication device comprising:
a. a plurality of keys;
b. a housing having a left side, a right side, a front side:
c. a keypad module configured to be attached to the housing and including a keypad inlay, a left side and a right side; and
d. first and second latches that engage first and second catches, respectively, when the keypad inlay is attached to the housing, thereby securing the keypad inlay to the housing;
e. wherein the first and second latches are released from the first and second catches, respectively, when at least two of the plurality of keys are simultaneously depressed, thereby releasing the keypad inlay from the housing, and wherein each of the at least two of the plurality of keys actuates an electronic switch when depressed.

20. A method of detaching a keypad module from a portable communication device having a housing plurality of keys, the keypad module including a keypad inlay, the method comprising:
a. releasing the keypad inlay from the housing by simultaneously depressing at least two of the plurality of keys, each of the at least two of the plurality of keys actuating an electronic switch when depressed; and
b. separating the keypad inlay from the housing.

21. The method of claim 20, wherein the plurality of keys comprises a send key and an end key and releasing the keypad inlay from the housing by simultaneously depressing at least two of the plurality of keys, comprises simultaneously depressing the send key and the end key.

22. The method of claim 21, wherein releasing the keypad inlay from the housing by simultaneously depressing at least two of the plurality of keys, comprises disengaging at least one latch from a respective at least one catch by simultaneously depressing at least two of the plurality of keys.

23. The method of claim 20, wherein releasing the keypad inlay from the housing by simultaneously depressing at least two of the plurality of keys, comprises simultaneously depressing at least two of the plurality of keys using an off-center keystroke on each of the at least two of the plurality of keys, and wherein a non-off-center keystroke on either or both of the left and right side buttons will not release the keypad inlay when the left and side buttons are simultaneously depressed.

24. A keypad module for a portable communication device including a plurality of keys and housing having a left side, a right side, a front side, the keypad comprising:
   a. a keypad inlay having a left side and a right side;
   b. means for securing the keypad inlay to the front side of the housing; and
   c. means for releasing the keypad inlay from the housing;
   d. wherein the means for releasing the keypad inlay enables the keypad inlay to be removed from the housing by simultaneously depressing at least two of the plurality of keys using an off-center keystroke, and wherein a non-off-center keystroke on either or both of the at least two of the plurality of keys will not release the keypad inlay when the at least two of the plurality of keys are simultaneously depressed.

25. The keypad module of claim 24, wherein the at least two of the plurality of keys comprises a left side button located on either the left side of the housing or the left side of the keypad inlay and a right side button on either the right side of the housing or right side of the keypad inlay and the means for releasing the keypad inlay from the housing comprises simultaneously depressing the left and right side buttons.

\* \* \* \* \*